(12) United States Patent
Grimsrud et al.

(10) Patent No.: US 6,253,296 B1
(45) Date of Patent: Jun. 26, 2001

(54) DISK BLOCK ALLOCATION OPTIMIZATION METHODOLOGY AND APPLICATIONS

(75) Inventors: Knut S. Grimsrud, Aloha; Richard L. Coulson, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/002,891

(22) Filed: Jan. 5, 1998

Related U.S. Application Data

(63) Continuation-in-part of application No. 08/885,325, filed on Jun. 30, 1997, which is a continuation-in-part of application No. 08/822,640, filed on Mar. 21, 1997, which is a continuation-in-part of application No. 08/721,826, filed on Sep. 27, 1996, which is a continuation-in-part of application No. 08/708,983, filed on Sep. 6, 1996.

(51) Int. Cl.$^7$ ................................................. G06F 13/00
(52) U.S. Cl. ............................ 711/165; 711/163; 711/167; 711/156
(58) Field of Search ................................. 711/113, 168, 711/112, 163, 165, 167, 100, 156; 710/31; 707/205; 369/32

(56) References Cited

U.S. PATENT DOCUMENTS

| | | | | |
|---|---|---|---|---|
| 4,536,837 | * | 8/1985 | Olson et al. | 707/205 |
| 5,257,370 | * | 10/1993 | Letwin | 711/113 |
| 5,345,575 | * | 9/1994 | English et al. | 711/112 |
| 5,548,788 | * | 8/1996 | McGillis et al. | 710/31 |
| 5,708,632 | * | 1/1998 | Totsuka et al. | 369/32 |
| 5,802,593 | * | 9/1998 | Grimsrud | 711/165 |

\* cited by examiner

Primary Examiner—Matthew Kim
Assistant Examiner—Fred F. Tzeng
(74) Attorney, Agent, or Firm—Blakely, Sokoloff, Taylor & Zafman LLP

(57) ABSTRACT

An apparatus is equipped with a disk block reallocator that operates to generate an improved alternate disk block allocation to a current disk block allocation, if possible. The disk block reallocator includes a reallocation optimizer that operates to generating the improved alternate disk block allocation employing a model to model a sequence of accesses against the current disk block allocation, and a number of model pruning criteria to prune the model.

47 Claims, 18 Drawing Sheets

LOGICAL TRACE DATA

| ACCESS | OPERATION | OFFSET INTO FILE | SIZE | FILE ID | |
|---|---|---|---|---|---|
| 0 | READ/WRITE/OPEN | $P_0$ | $B_0$ | | ⎫ |
| 1 | " | $P_1$ | $B_1$ | | ⎬ 61 |
| ⋮ | " | " | " | | ⎭ |
| 63 | 65 | 67 | 69 | 71 | |

DISK BLOCK ALLOCATION OPTIMIZATION METHODOLOGY AND APPLICATIONS

RELATED APPLICATIONS

This application is a continuation-in-part application to U.S. patent application, Ser. No. 08/885,325, entitled Disk Block Allocation Optimization Methodology and Applications, filed on Jun. 30, 1997, which is a continuation-in-part application to the following U.S. patent applications:
  (a) Ser. No. 08/708,983, entitled Method and Apparatus For Improving Disk Drive Performance, filed on Sep. 6, 1996;
  (b) Ser. No. 08/721,826, also entitled Method and Apparatus For Improving Disk Drive Performance, filed on Sep. 27, 1996; and
  (c) Ser. No. 08/822,640, entitled Reducing Operating System Start Up/Boot Time Through Disk Block Relocation, filed on Mar. 21, 1997.

BACKGROUND OF THE INVENTION

1. Field of the Invention

The present invention relates to the field of computer systems. More specifically, the present invention relates to disk block allocation optimization methodology and applications.

2. Background Information

In the art of computer systems, many problems involve optimizing disk block allocations. For example, in the past decade, performance of microprocessor based computer systems have increased dramatically. In particular, the operating speed of microprocessors have increased from the meager 16 MHz to well over 200 MHz. This trend is expected to continue without abatement. Correspondingly, while not as dramatic, performance of system and input/output (I/O) buses have also improved substantially, ensuring the microprocessors have adequate data to work with and kept busy. However, except for the improvement provided by buffering etc., the performance of disk drive has lagged behind. As a result, users are often deprived of the full benefit of the increased performance by the microprocessors. As a result, when starting up an application or booting up an operating system, because the large majority of time is often spent on loading the application or operating system routines into memory from a disk drive, a user often does not see significant difference in performance whether the user is using a system equipped with a 100 MHz microprocessor or a 200 MHz microprocessor. Thus, further improvement in disk drive performance is desirable, and as will be disclosed in more detail below, the present invention provides the desired improvement in disk drive performance as well as other desirable results, which will be readily apparent to those skilled in the art, upon reading the detailed description to follow.

SUMMARY OF THE INVENTION

An apparatus is equipped with a disk block reallocator that operates to generate an improved alternate disk block allocation to a current disk block allocation, if possible. The disk block reallocator includes a reallocation optimizer that operates to generate the improved alternate disk block allocation employing a model to represent a sequence of accesses against the current disk block allocation, and a number of model pruning criteria to prune the model.

In one embodiment, the disk block reallocator further includes a tracer that operates to trace the sequence of accesses, and a reallocation engine that operates to effectuate the alternate disk block allocation, if generated.

In one embodiment, the disk block reallocator is a standalone utility. In another embodiment, the disk block reallocator is embodied as an integral part of an installation utility of an application. In yet another embodiment, the tracer is embodied as an integral part of an operating system, whereas the remainder of the disk block reallocator is embodied as a standalone complementary utility to the tracer.

In one embodiment, the apparatus is a computer system, and the disk block reallocator is implemented using programming instructions.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
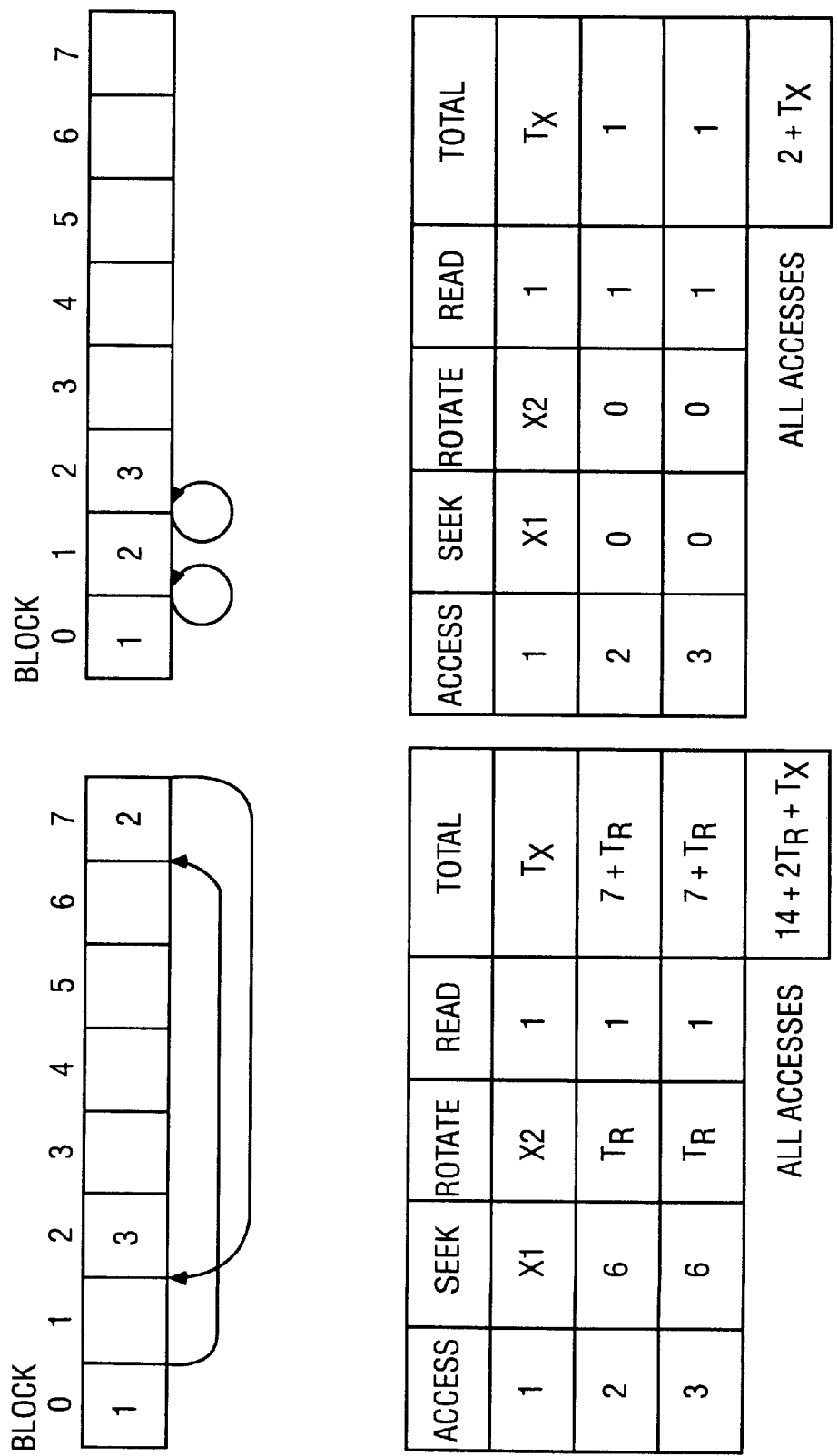
FIG. 1 is a simplified illustration of the present invention.

Referring now to FIG. 1, wherein a simplified illustration of the disk block allocation optimization technique of the present invention is shown. Illustrated on the top half of the figure are two simplified block representations 10a and 10b of a disk drive having eight blocks, block 0 through block 7. Denoted therein inside the blocks accessed by the three accesses of a simple sequence of disk accesses are the access identifiers, access 1, access 2 and access 3. The access pattern denoted in simplified block representation 10a illustrates the manner in which the three accesses are made, under an hypothetical disk block allocation, without optimization in accordance with the present invention, whereas the access pattern denoted in simplified block representation 10b illustrates the manner in which the same three accesses are made, under an alternate optimized disk block reallocation, wherein the data previously stored in block 7 has been moved to block 1, in accordance with the present invention.

Illustrated in the bottom half of the figure are illustrative estimates of the access times (in milli-seconds) for the three accesses under the unoptimized and optimized disk block allocations. As shown, the read times are substantially the same for all accesses under either allocation, however, under the optimized disk block allocation, significant amount of time savings will be achieved for seek and rotation times, as the block displacement between the successive accesses are much smaller, as compared to the unoptimized disk block allocation. In other words, by reallocating disk blocks, if it can be done, significant performance improvement may be achieved for a sequence of disk accesses.

The above simplified illustration is merely provided for ease of understanding. The problem addressed by the present invention is many times more complex than the simplified illustration. The lengths of the access sequences that are of interest are typically significantly longer. Additionally, many blocks are accessed multiple times in one sequence, and the multiple accesses are not necessarily in the same order. In other words, block x may be accessed n times in a sequence of interest, the first time after accessing block y, the second time after accessing block z, and so forth. Furthermore, not all blocks are available for reallocation. Thus, the optimized disk block reallocation is seldom as simple as reallocating the disk blocks into a group of contiguous disk blocks, as illustrated by block representation 10b.

Figure 2:
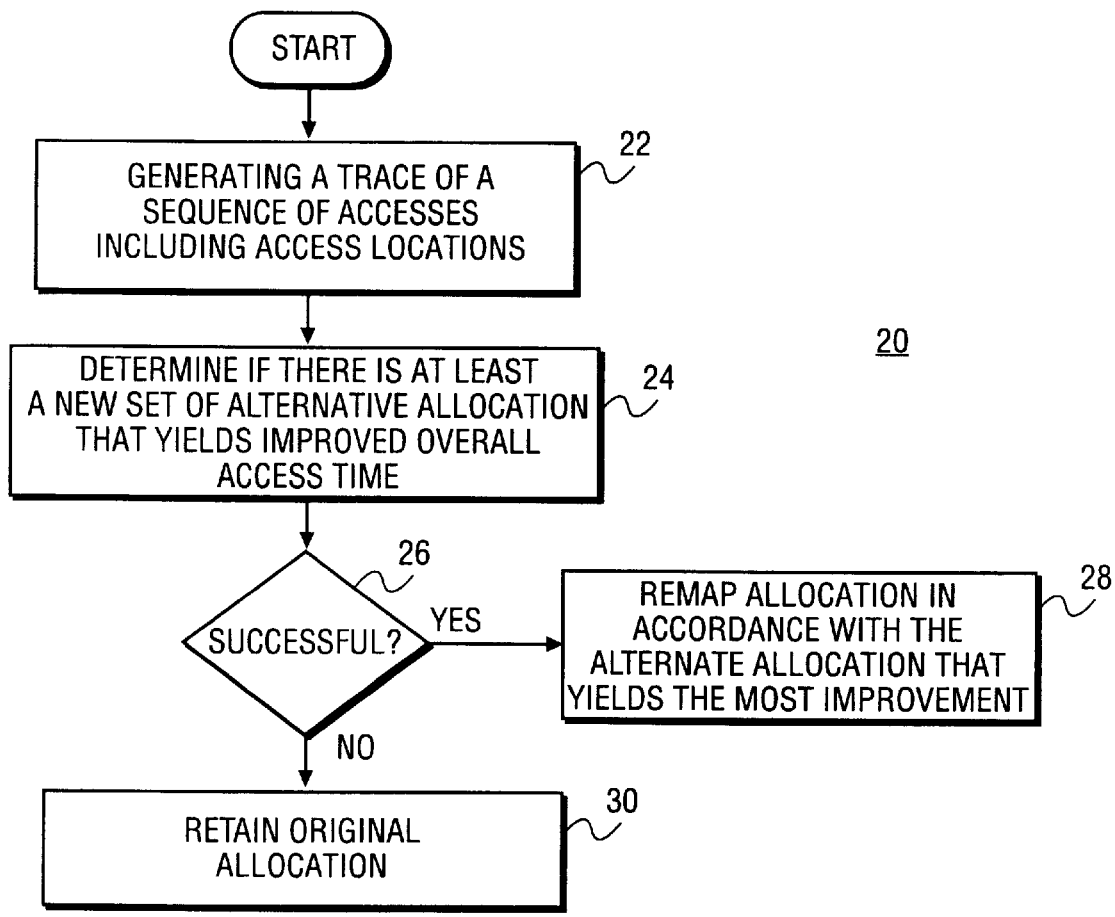
FIG. 2 illustrates one embodiment of the method of the present invention.

FIG. 2 illustrates one embodiment of the method steps of the disk block allocation optimization technique of the present invention. As shown, for the illustrated embodiment, a trace is first generated for a sequence of accesses that are of interest, step 22. The trace includes either the disk locations accessed or information that can be used to determine the disk locations accessed. Next, one or more attempts are made to generate an alternate disk block allocation that will yield improved overall access time, as determined by a cost function, step 24. An example of a simple cost function, for illustrative purposes, is $T = d \times c_1 + c_2 + c_3$, where T is access time, d is seek distance, $c_1$ is seek time per unit of seek distance, $c_2$ is rotation time, and $c_3$ is read time. If at least one of the attempts is successful, the data are remapped into the alternate disk block allocation that yields the most improvement in overall access time, step 28. Otherwise, the original disk block allocation is retained, step 30.

Figure 3A:
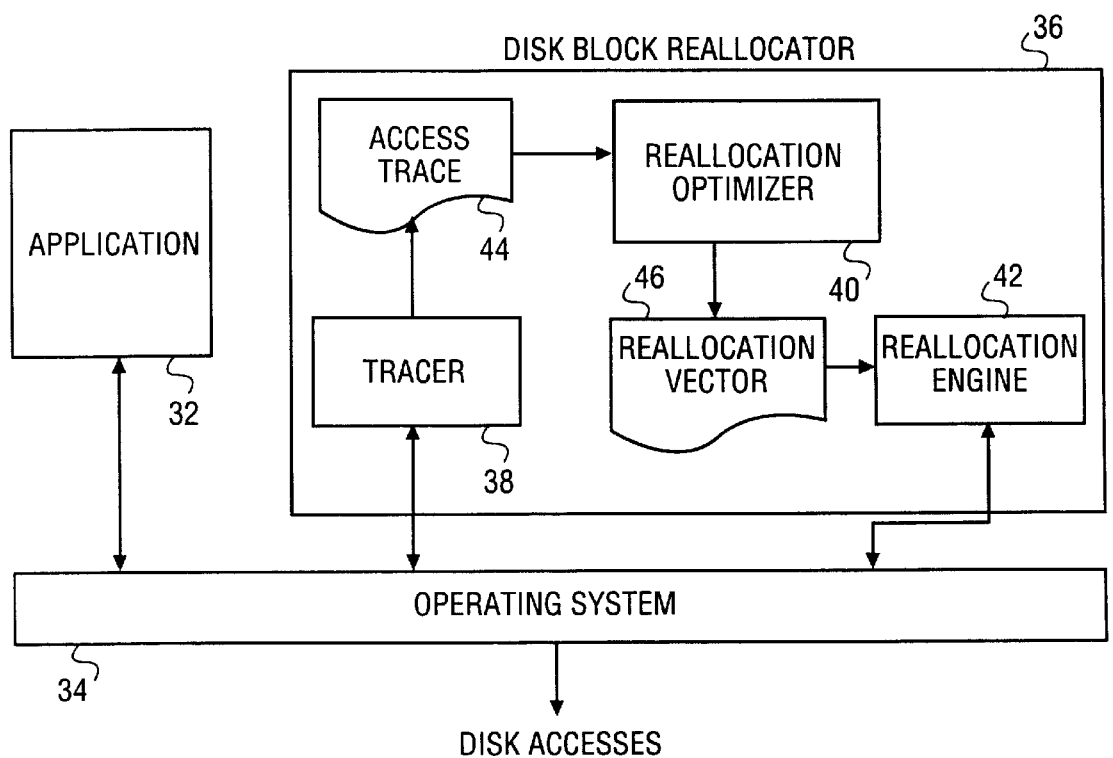
FIGS. 3a–3c illustrate three embodiments of the present invention.
Figure 3B:
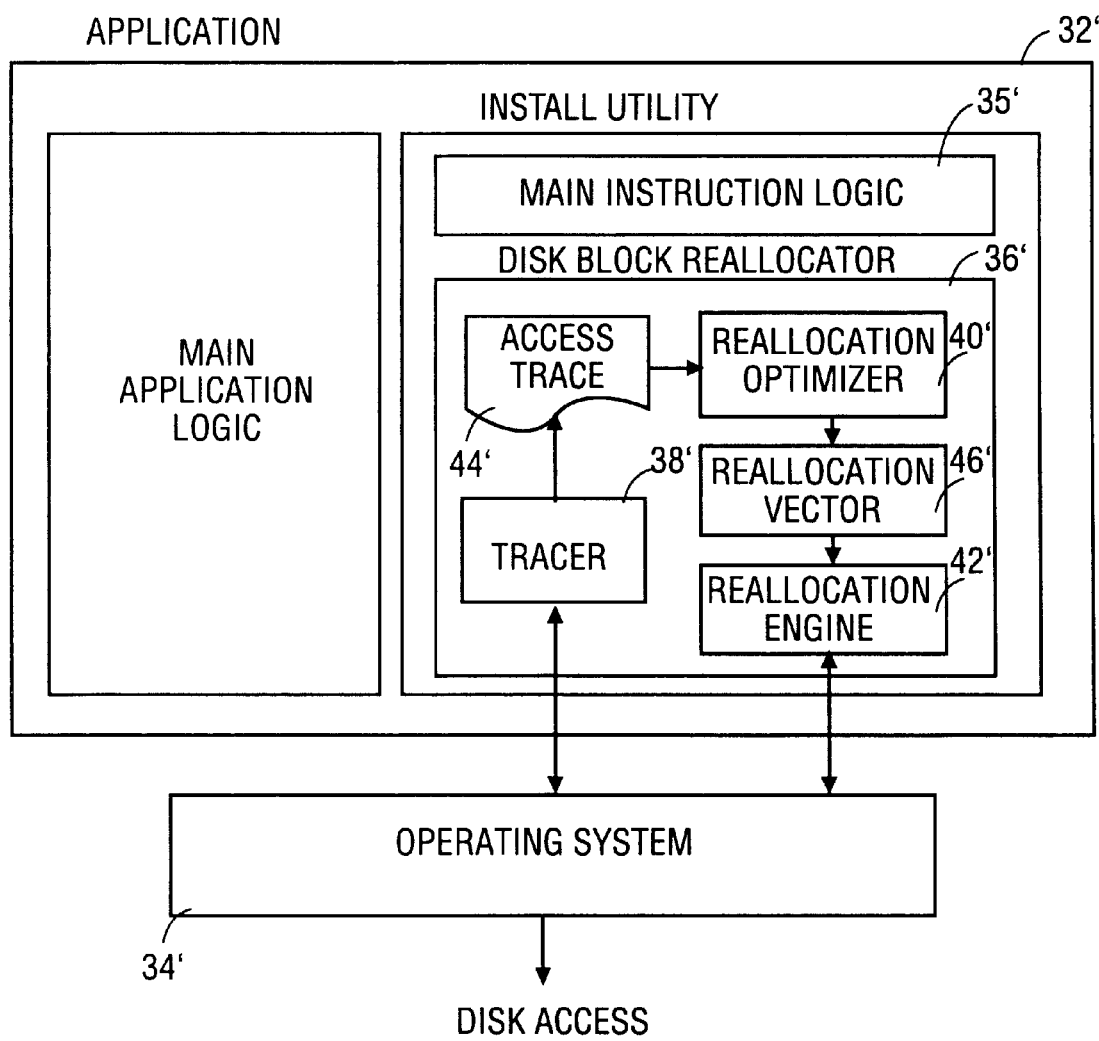
Figure 3C:
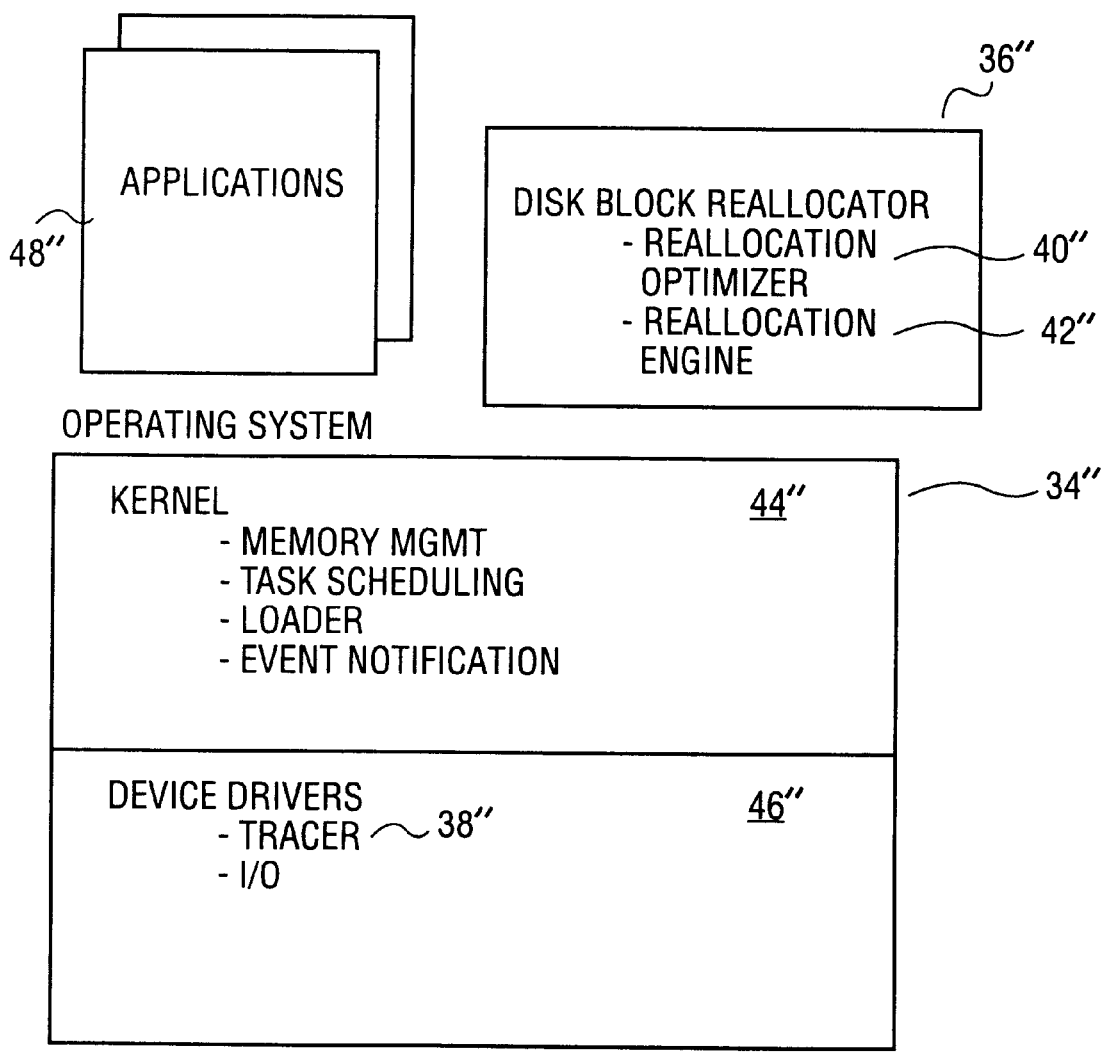

FIGS. 3a–3c illustrate three embodiments of the present invention. In FIG. 3a, the disk block allocation optimization technique of the present invention is embodied in a standalone disk block reallocator 36, which may be invoked by a user at will to optimize a set of disk block allocations, e.g. disk blocks that are targets of a sequence of disk accesses, such as those made by application 32. Disk block reallocator 36 includes tracer 38, reallocation optimizer 40 and reallocation engine 42. Tracer 38 traces the disk accesses made by application 32. In one embodiment, tracer 38 first traces file accesses made by application 32, which are subsequently mapped to physical disk blocks accessed. In an alternate embodiment, tracer 38 traces the physical disk blocks accessed directly. For the illustrated embodiment, operating system 34 provides I/O read/write services for accessing disk drives, and application 32 utilizes these I/O read/write services when accessing file data stored on disk drives. Furthermore, operating system 34 provides event notification services, and tracer 38 leverages on these services to directly or indirectly trace disk accesses performed by application 32. Tracer 38 logs the physical trace results in access trace 44.

Reallocation optimizer 40 is used to generate, if possible, an alternate disk block allocation that will yield improved overall access time for the sequence of disk accesses, using the trace results logged in access trace 44. If successful, reallocation optimizer 40 generates reallocation vector 46 setting forth the manner in which the disk blocks should be reallocated. Reallocation engine 42 is then used to effectuate the reallocation as stipulated by reallocation vector 46.

In FIG. 3b, the disk block allocation optimization technique of the present invention is embodied as disk block reallocator 36', which is an integral part of installation utility 35'. Integrated disk block allocator 36' is used to optimize the disk block allocation for the disk blocks accessed during start up of application 32'. Similarly, disk block reallocator 36' includes tracer 38', reallocation optimizer 40' and reallocation engine 42'. Tracer 38' traces the disk accesses made by application 32' during start-up. In one embodiment, tracer 38' first traces file accesses made by application 32', which are subsequently mapped to physical disk blocks. In an alternate embodiment, tracer 38' traces the physical disk blocks accessed directly. For the illustrated embodiment, operating system 34' provides I/O read/write services for accessing disk drives, and application 32' utilizes these I/O read/write services when accessing file data stored on disk drives. Furthermore, operating system 34' provides event notification services, and tracer 38' leverages on these services to directly or indirectly trace disk accesses performed by application 32'. Tracer 38' logs the physical trace results in access trace 44'.

In like manner, reallocation optimizer 40' is used to generate, if possible, an alternate disk block allocation that will yield improved overall access time for the disk blocks accessed by application 32' during start-up, using trace results logged in access trace 44. If successful, reallocation optimizer 40 generates reallocation vector 46 setting forth the manner in which the disk blocks should be reallocated. Reallocation engine 42 is then used to effectuate the reallocation as stipulated by reallocation vector 46.

In FIG. 3c, tracer 38" is packaged as an integral part of operating system 34", and the remainder of the disk block allocation optimization technique of the present invention is embodied as complementary disk block reallocator 36". Complemented disk block reallocator 36" is used to optimize the disk block allocation for the disk blocks accessed during start-up/booting of operating system 34". Tracer 38" traces the disk accesses made by operating system 34" during start-up/boot-up. Tracer 38" logs the trace results in an access trace (not shown). In one embodiment, tracer 38" first traces file accesses made by operating system 34", which are subsequently mappedto physical disk blocks accessed. In an alternate embodiment, tracer 38" traces the physical disk blocks accessed directly.

Complementary disk block reallocator 36" includes reallocation optimizer 40" and reallocation engine 42". Reallocation optimizer 40" is used to generate, if possible, an alternate disk block allocation that will yield improved overall access time for the disk blocks accessed by operating system 34" during start-up/boot-up, using trace results logged in access trace. If successful, reallocation optimizer 40" generates a reallocation vector (not shown) setting forth the manner in which the disk blocks should be reallocated. Reallocation engine 42" is then used to effectuate the reallocation as stipulated by reallocation vector 46".

Figure 4A:
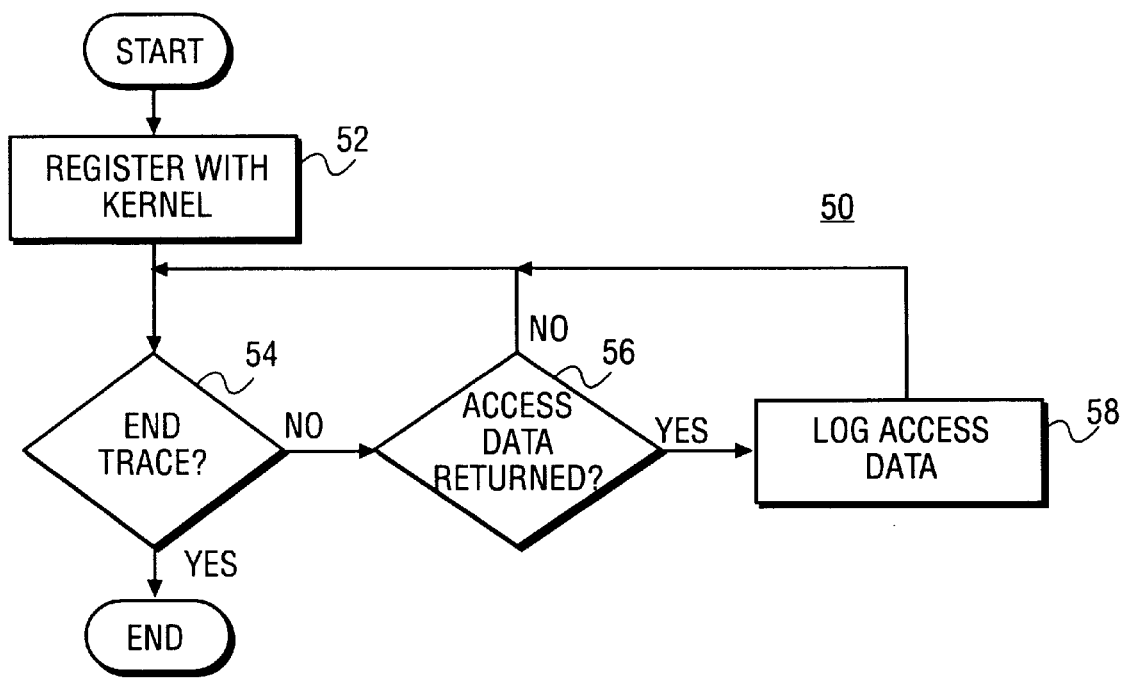
FIGS. 4a–4c illustrate one embodiment of the operational flow of the tracer, with the tracer traces file accesses, and subsequently maps the traced accesses to physical disk blocks.
Figures 4B, 4C:
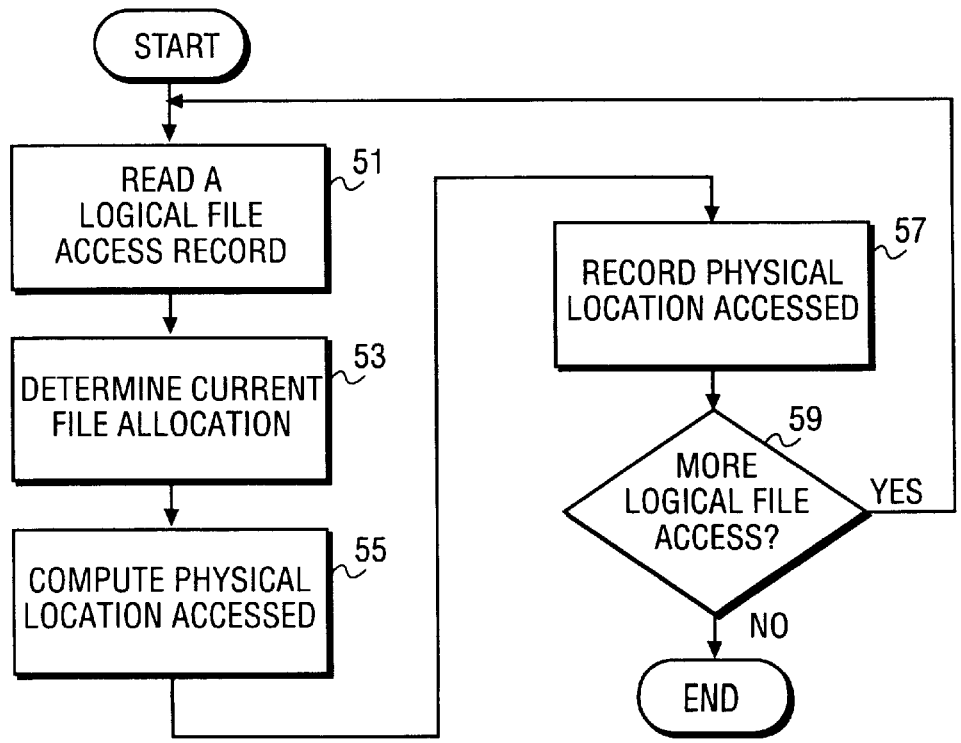

FIGS. 4a–4c illustrate one embodiment of tracer 38, where tracer 38 first traces file accesses, which are subsequently mapped to physical disk blocks. As shown in FIG. 4a, for the illustrated embodiment, upon invocation, tracer 38 registers itself with operating system 34, denoting its interest in file/disk accesses, in particular, the logical/physical locations accessed, step 52. Upon registering itself, tracer 38 waits for the requested information to be returned from operating system 34, and logs the access data as they are returned, as long as the trace period has not elapsed, steps 54–58. Tracer 38 may be encoded or dynamically provided with the length of the trace period.

FIG. 4b illustrates one embodiment of a logical access trace 43. As shown, for the illustrated embodiment, logical access trace 43 includes a number of file access records 61. Each access record 61 includes an access identifier 63 identifying the access sequence number, a file identifier 71 identifying the file accessed, the file access operation performed 65, e.g. read, write or open, an offset into the file accessed 67, and the size of the data accessed 69, e.g. the number of bytes.

FIG. 4c illustrates one embodiment of the mapping operational flow of tracer 38. As shown, for the illustrated embodiment, the mapping process starts at step 51, where tracer 38 retrieves a logical file access record 61. Next, based on the file identification information 71, tracer 38 determines the disk blocks allocated to the file accessed, step 53.

Then, based on access offset and size information 67 and 69, tracer 38 computes the specific disk blocks accessed, step 55. Once computer, tracer 38 records the physical disk block information for subsequent use, step 57. The physical disk block information may be recorded or maintained in any one of a number data structures known in the art. Tracer 38 repeats the above described steps until it is determined at step 59 that all logical file access records have been processed.

Either the direct or the indirect tracing approach described above may be employed to practice the present invention. The direct approach has the advantage of being simpler to implement, however tracing is re-performed each time optimization is to be performed, even though it is for the same access interest. On the other hand, the indirect approach involves additional complexity, however it has the advantage of just having to re-perform the mapping operation (without retracing), whenever optimization is re-performed for the same access interest.

Figures 5, 6:
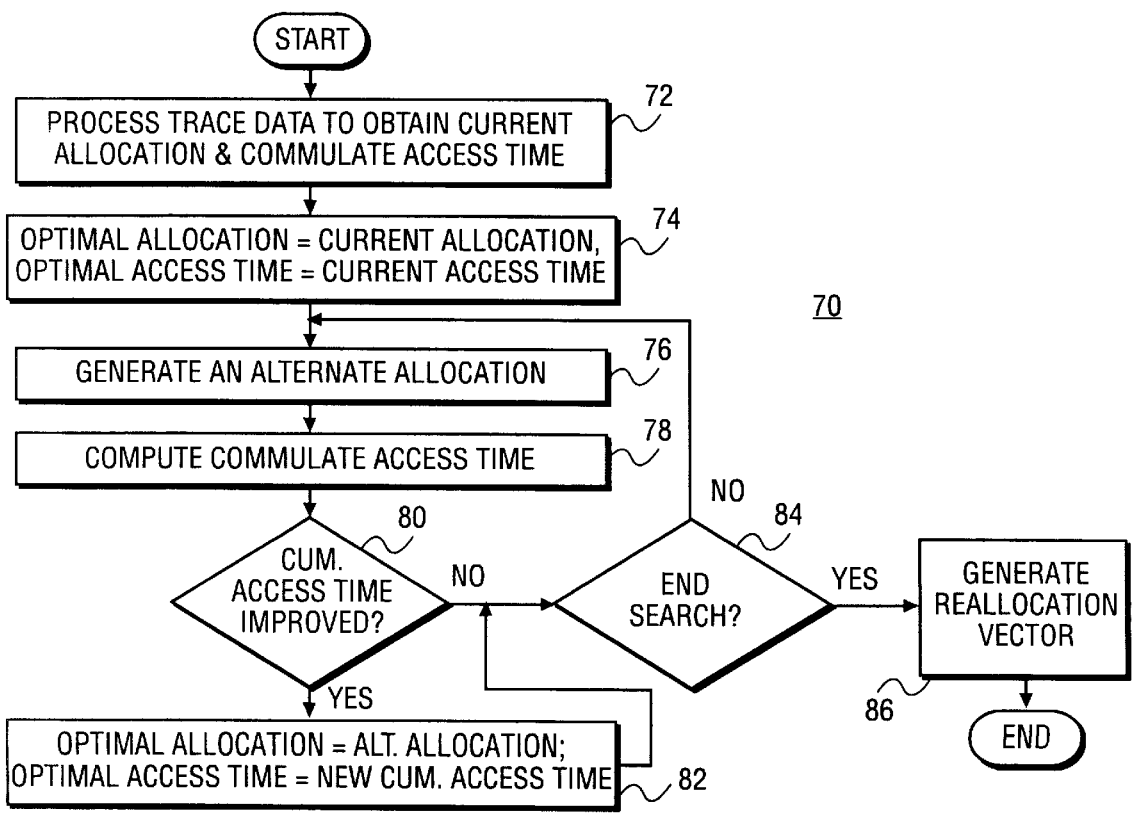
FIG. 5 illustrates one embodiment of the physical trace log.
FIG. 6 illustrates one embodiment of the operational flow of the reallocation optimizer for generating an alternate disk block allocation.

FIG. 5 illustrates one embodiment of a data structure for maintaining the mapped physical disk block information. As shown, for the illustrated embodiment, the data structure includes a number of physical access records 62. Each physical access record 62 includes an access identifier 64 identifying the access sequence number, and the disk blocks accessed 66.

Referring now to FIG. 6, wherein one embodiment of the operational flow of reallocation optimizer 40 is illustrated. As shown, for the illustrated embodiment, upon invocation, reallocation optimizer 40 processes the trace data recorded in physical trace 44 to obtain the current disk block allocation for the sequence of file/disk accesses of interest, i.e. the disk locations accessed, and in turn generates the cumulative access time for the current disk block allocation, step 72. Next, reallocation optimizer 40 notes that current disk block allocation as the optimal disk block allocation, and the current cumulative access time as the optimal cumulative access time, step 74. [Note that as with all optimization techniques, the optimal access time referred herein is optimal only in the sense within the context and precision of the present optimization technique, and is not necessarily the absolute best result that can be achieved.]

Having done so, reallocation optimizer 40 generates an alternate disk block allocation with randomized incremental changes, step 76. Randomized incremental changes may be synthesized in accordance with any number of such techniques known in the art. Using the generated alternate disk block allocation, reallocation optimizer 40 determines a new cumulative access time for the sequence of disk accesses of interest, step 78. If the generated alternate disk block allocation yields improved overall access time, i.e. the new cumulative access time is better than the "optimal" cumulative access time, reallocation optimizer 40 notes the generated alternate disk block allocation as the optimal disk block allocation, and the new cumulative access time as the optimal cumulative access time, step 82. Otherwise, step 82 is skipped.

Steps 76–80 and conditionally step 82 are repeated until a predetermined condition for terminating the search for alternate disk block allocation that yields improved overall access time has been met. A variety of termination conditions may be employed. For example, reallocation optimizer 40 may be encoded or dynamically provided with a parameter delimiting the "length" of search, in terms of total evaluation or elapsed time, number of alternate reallocation schemes evaluated, etc. At the conclusion of the search, reallocation optimizer 40 generates reallocation vector 46 denoting the reallocation to be performed, based on the optimal disk block allocation, step 86. For the illustrated embodiment, if the optimal disk block allocation was never updated, i.e. no disk block allocation yielding improved overall access time was found, reallocation vector 46 is a null vector.

Figure 7:
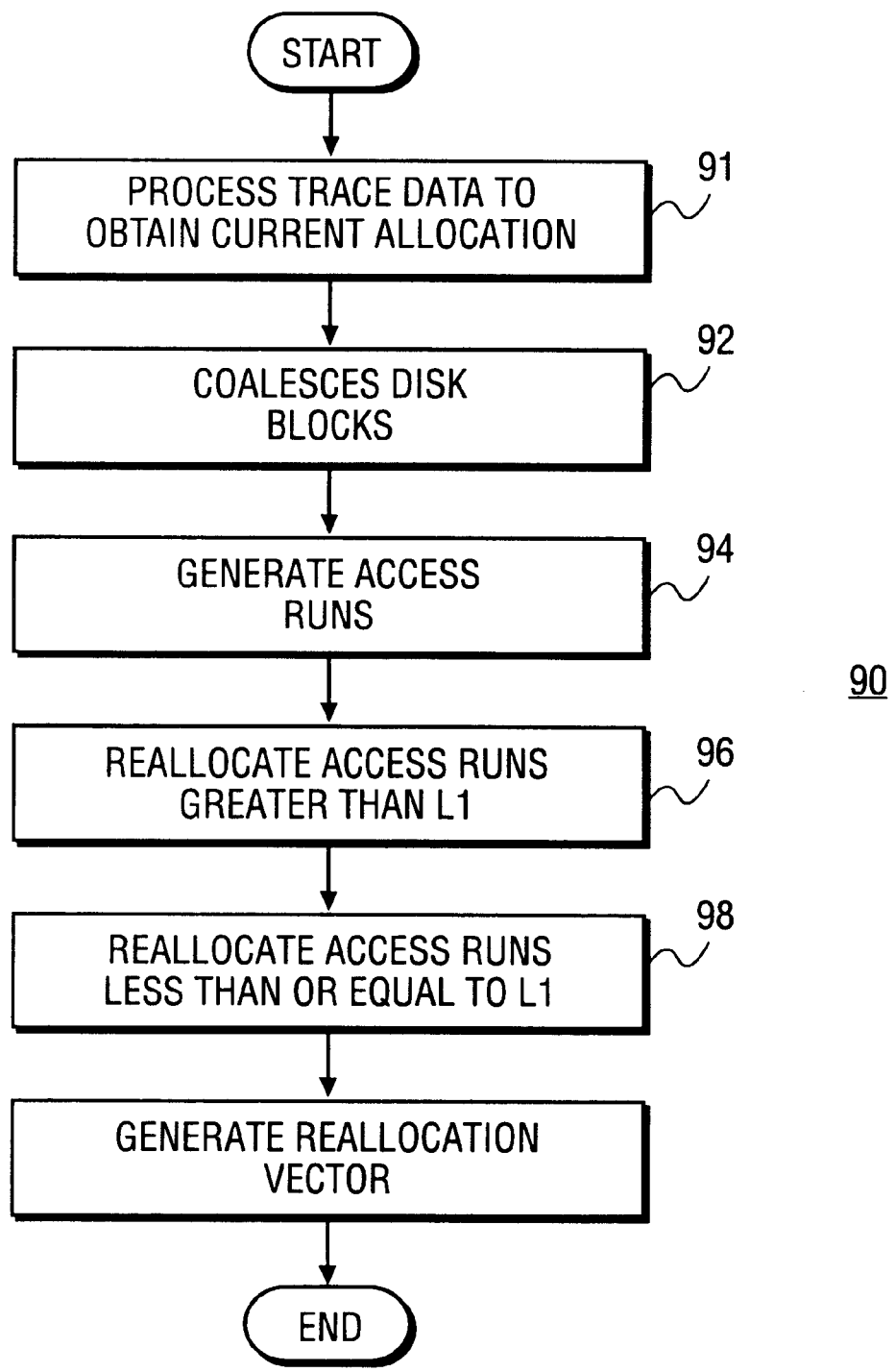
FIG. 7 illustrates an alternative embodiment of the operational flow of the reallocation optimizer for generating an alternate disk block allocation.

FIG. 7 illustrates an alternate embodiment of reallocation optimizer 40. As shown, for the illustrated embodiment, upon invocation, similar to the earlier described embodiment, reallocation optimizer 40 processes the trace data recorded in access trace 44 to obtain the current disk block allocation for the sequence of disk accesses of interest, i.e. the disk locations accessed, and in turn computes the cumulative access time for the current disk block allocation, step 91. Next, unlike the earlier described embodiment, reallocation optimizer 40 coalesces the disk blocks, step 92. Coalescing the disk blocks may be performed in any one of a number of known techniques. One approach will be briefly described later.

Figure 8:
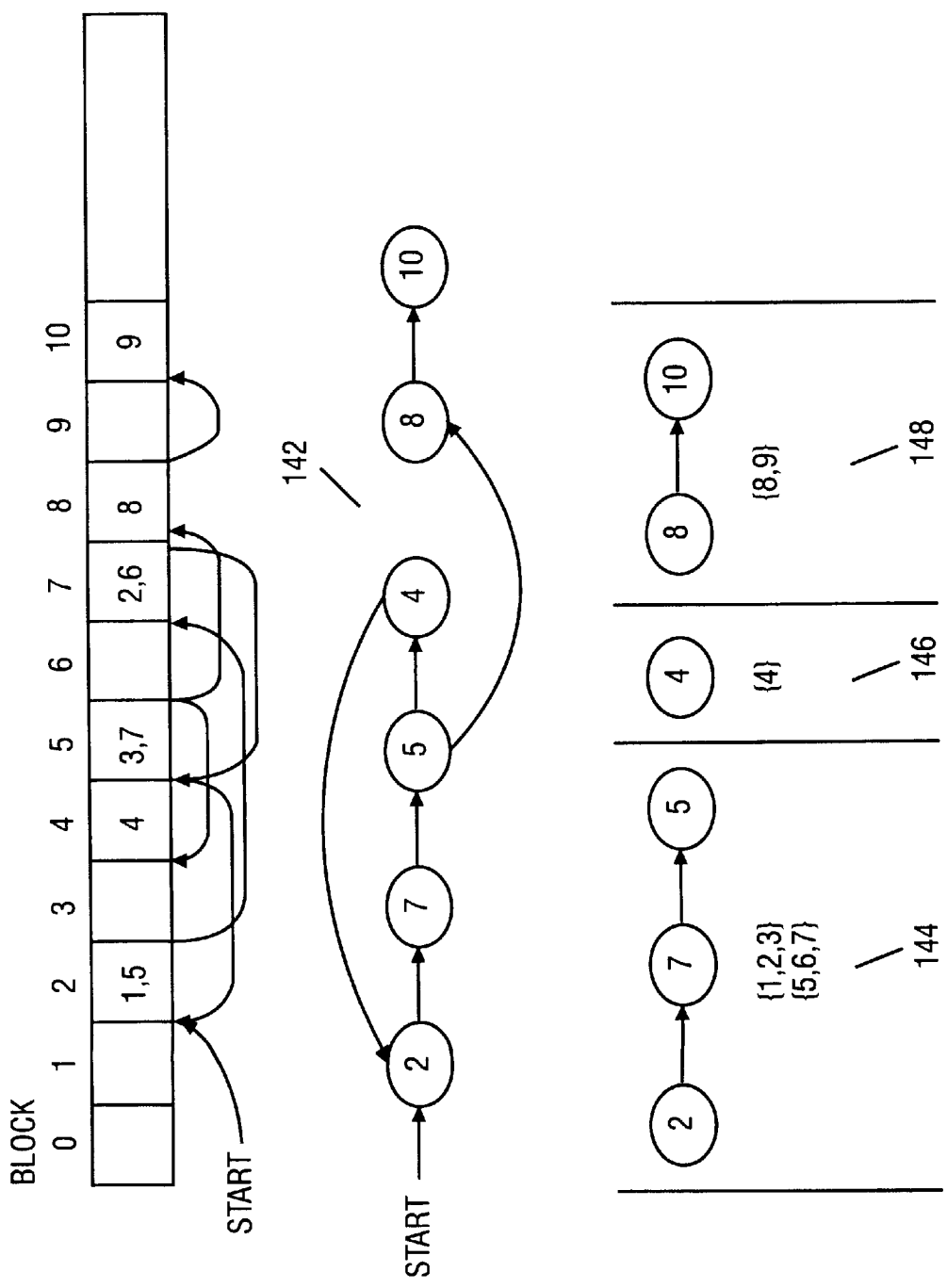
FIG. 8 illustrates in further details the concept of access run.

Having coalesced the disk blocks, reallocation optimizer 40 proceeds to analyze the trace data and groups the disk accesses into access runs, step 94. FIG. 8 illustrates the concept of access runs. Illustrated therein is a hypothetical sequence of disk accesses, access 1 through access 9, against the enumerated blocks in the order shown. For this hypothetical sequence of disk accesses, blocks 2, 7 and 5 are always accessed as a "run". These blocks are accessed in order during access 1 through access 3, and then during access 5 through access 7. Likewise, blocks 8 and 10 are also considered as a "run", except it is accessed only once. Block 4 is a "run" with a run length of one.

Return now to FIG. 7, having grouped the accesses into access runs, reallocation optimizer 40 reallocates the disk block on an access run basis. For the illustrated embodiment, the "longer" access runs are reallocated first, step 96, before the "shorter" access runs are reallocated, step 98. "Longer" access runs are access runs with run lengths greater than a predetermined run length threshold (L1), whereas "shorter" access runs are access runs with run length shorter than L1. The value of L1 is application dependent, and is empirically determined. In one embodiment, L1 is set to 64. After, both the "longer" as well as the "shorter" access runs have been reallocated, reallocation optimizer 40 generates reallocation vector 46 as the earlier described embodiment.

Figure 9:
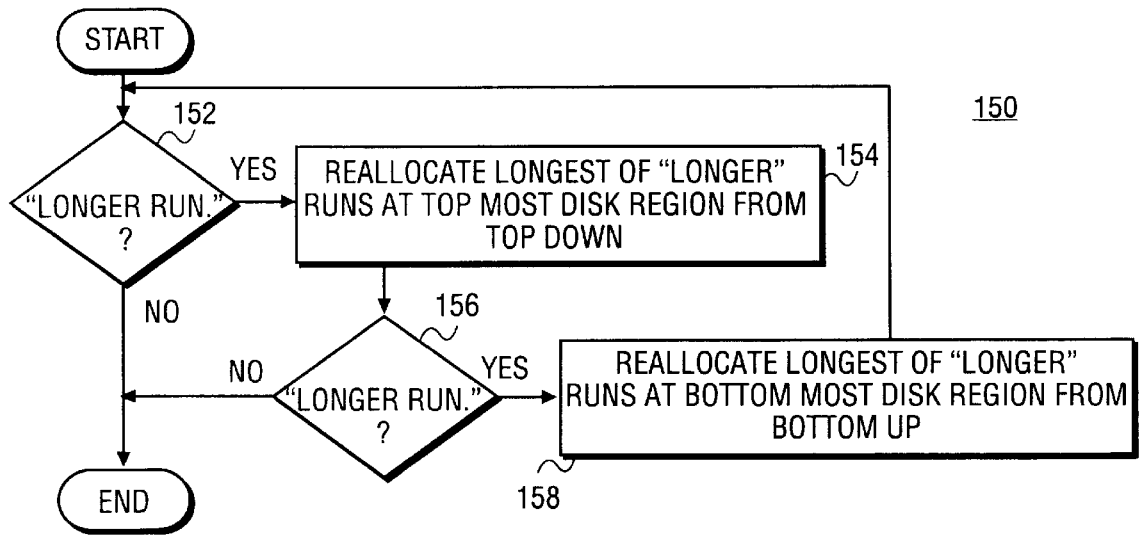
FIG. 9 illustrates in further details one embodiment of the "long access run" reallocation step.
Figure 10:
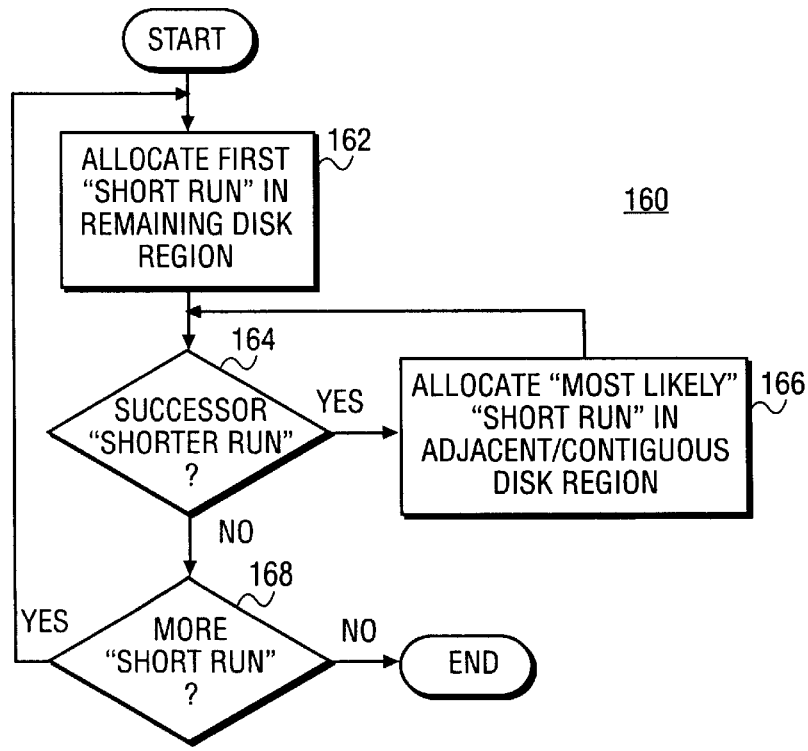
FIG. 10 illustrates in further details one embodiment of the "short access run" reallocation step.
Figure 11:
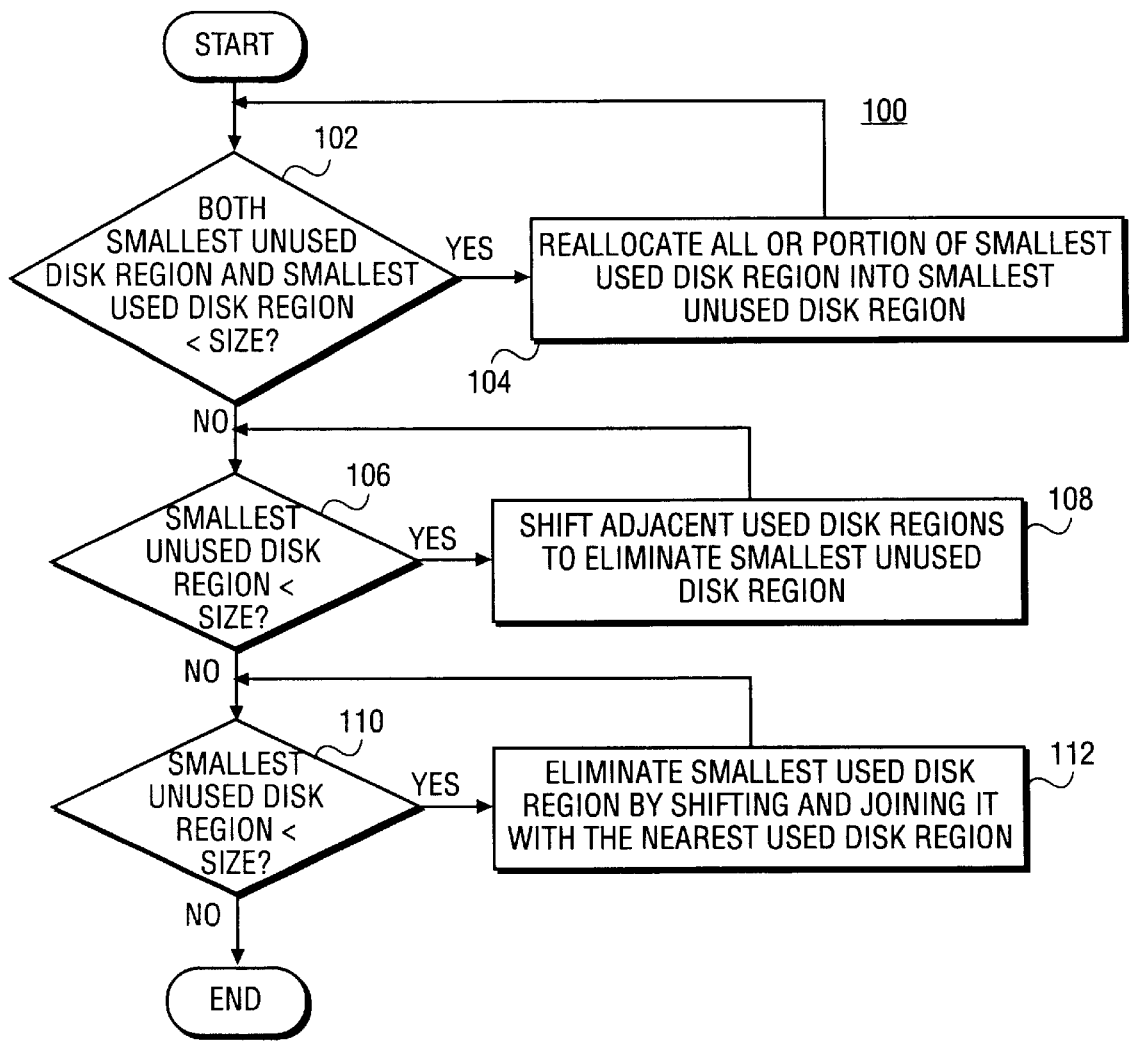
FIGS. 11–14 illustrate in further details one embodiment of the coalescing step.

FIGS. 9–10 illustrate one embodiment each for reallocating the "longer" and "shorter" access runs. As shown in FIG. 9, for the illustrated embodiment, reallocation optimizer 40 reallocates the "longer" access runs to contiguous disk regions at both ends of a disk, alternating between the two ends, until all "longer" access runs have been reallocated. At step 152, reallocation optimizer 40 determines if there are still "longer" access runs to be reallocated. If the determination is affirmative, for the illustrated embodiment, reallocation optimizer 40 reallocates the longest of the remaining "longer" run to the "top most" portion of the disk region, step 154. At step 156, reallocation optimizer 40 again determines if there are still "longer" access runs to be reallocated. If the determination is affirmative, for the illustrated embodiment, reallocation optimizer 40 reallocates the longest of the remaining "longer" run to the "bottom most" portion of the disk region, step 158. Steps 152–158 are repeated until all "longer" access runs have been reallocated. As steps 154 and 158 are repeated, the "top most" portion bound reallocations are reallocated in a "top down" manner, whereas the "bottom most" portion bound reallocation are reallocated in a "bottom up" manner. In other words, the "center" portion of the disk region is left unallocated at the end of the "longer" access run reallocation.

As shown in FIG. 10, for the illustrated embodiment, reallocation optimizer 40 reallocates the "shorter" access runs, by first arbitrarily picking one of the "shorter" access runs, step 162. Then the successor "shorter" access runs to the selected "shorter" access run are reallocated near the selected "shorter" access run based on their likelihood of occurrence, i.e. the frequency of occurrence of the successor "shorter" access run, steps 164–166. A successor access run is simply an access run that follows the selected access run. Steps 164–166 are then repeated until all successor access runs to the selected access run are reallocated. Then, the entire "shorter" access run reallocation process, i.e. steps 162–166 are repeated until all "shorter" access runs have been reallocated.

The two approaches to reallocating "longer" and "shorter" access runs are complementary to each other. Together the two approaches provide the advantage of reducing the access time of the "shorter" access runs, since they are all concentrated at the "center" portion of the disk region, and the advantage of spreading the higher cost of moving to the end portions of the disk region over a larger number of accesses, since a number of successive accesses will be made at the end portions once the actuator is moved there.

Figure 12:
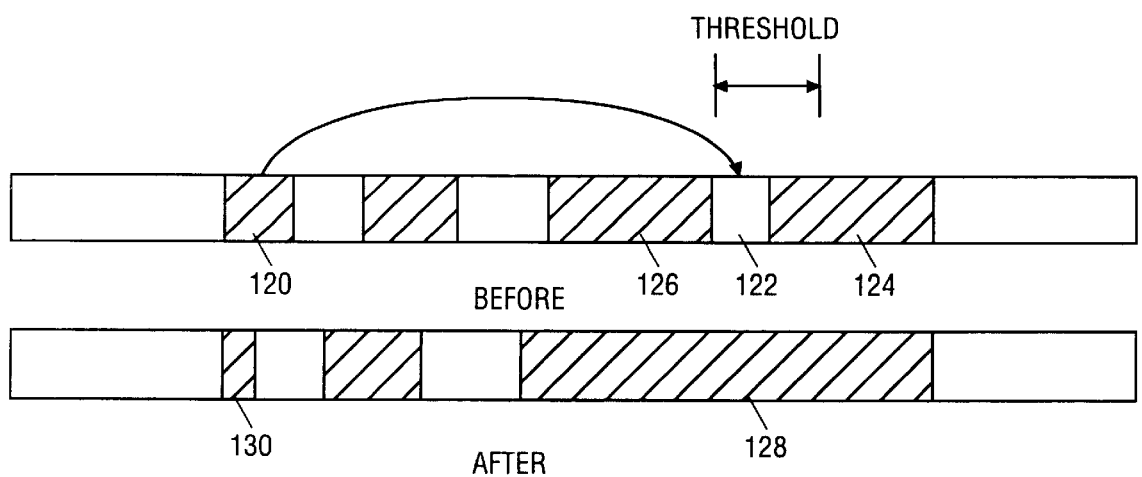

Returning now to the topic of coalescing disk blocks of a disk drive. FIGS. 11–14 illustrate one approach for achieving the desired coalescing of disk blocks. As shown, for the illustrated approach, reallocation optimizer 40 first determines if both the smallest unused disk region as well as the smallest used region are smaller than a predetermined size, step 102. [For the purpose of this application, an unused disk region is a disk region not accessed during the trace, the disk region may or may not have been allocated.] The value of the predetermined size is also application dependent, and empirically determined. In one embodiment, a value of 64 is also used for the predetermined size. If the determination is affirmative, reallocation optimizer 40 reallocates all or a portion of the smallest used disk region into the smallest unused disk region, step 104 (see also FIG. 12). Steps 102–104 are repeated until either the smallest unused disk region or the smallest used disk region is greater than or equal to the predetermined size. Together, these two steps have the effect of filling up the small "in-between"unused disk regions, and eliminate the small "in-between" used disk regions, as illustrated by FIG. 12.

Figure 13:
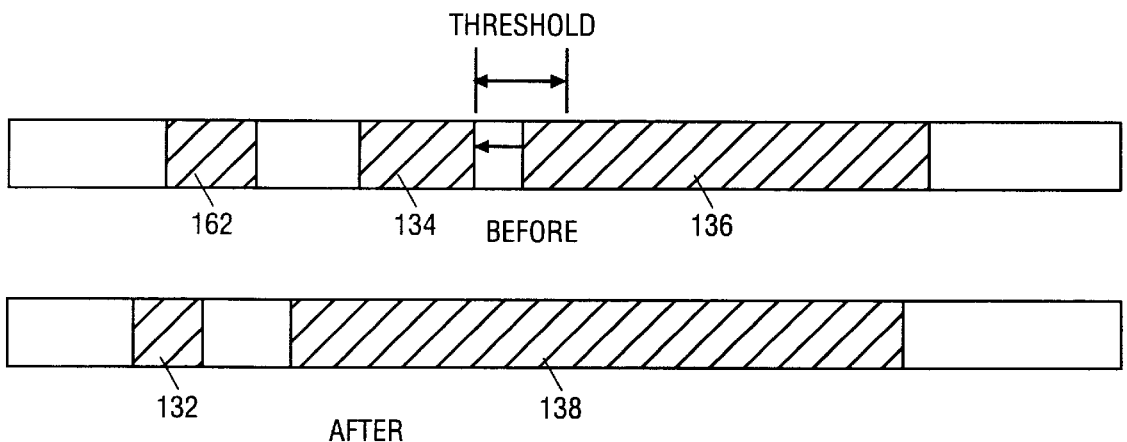

Next, for the illustrated approach, reallocation optimizer 40 determines if the smallest unused disk region is smaller than the predetermined size, step 106. If the determination is affirmative, reallocation optimizer 40 reallocates one or both of the two used disk regions bounding the smallest unused disk region, by shifting one towards the other, or both towards each other, step 108 (see also FIG. 13). Steps 106–108 are repeated until the smallest unused disk region is greater than or equal to the predetermined size. Together, these two steps have the effect of eliminating the "in-between" small unused disk regions as illustrated by FIG. 13.

Next, for the illustrated approach, reallocation optimizer 40 determines if the smallest used disk region is smaller than the predetermined size, step 110. If the determination is affirmative, reallocation optimizer 40 reallocates the smallest used disk region, by shifting it towards the closest neighboring used disk region, step 112 (see also FIG. 14). Steps 110–112 are repeated until the smallest used disk region is greater than or equal to the predetermined size.

Figure 14:
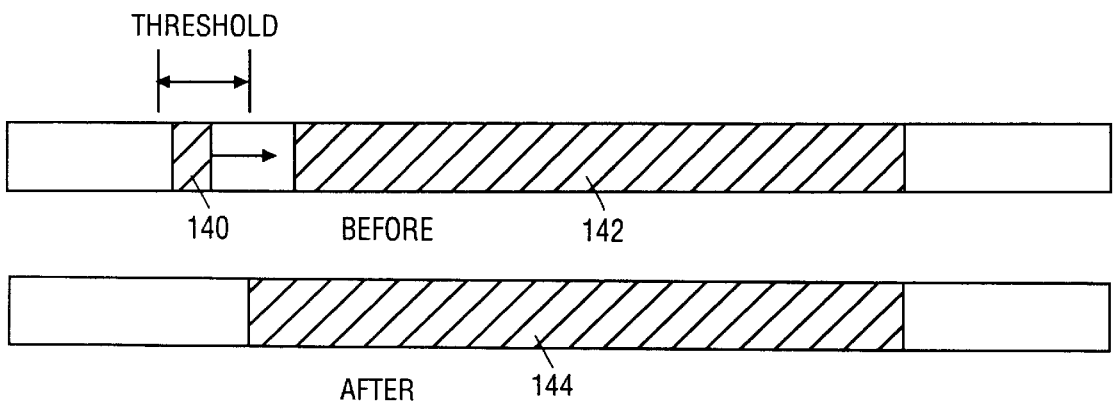

Together, these two steps have the effect of eliminating any "in-between" used disk regions as illustrated by FIG. 14.

While at first brush, the two embodiments for generating an alternate disk block allocation that yields improved overall access time appear to be very different, they are really two species of a genus of approaches to practically and optimally solving the cost function of overall access time, expressed in terms of disk block allocation, i.e. Min. C{b1, b2, ..., bn}, where C{ } is the cost function of overall access time, and (b1, b2, ... bn) is a set of disk block allocation.

Skipping now to FIGS. 16 and 17a–17d, wherein another alternate embodiment of the operational flow of reallocation optimizer 40 for generating the improved alternate disk block allocation is illustrated. For the illustrated embodiment, a model is employed to represent a sequence of accesses against the current disk block allocation, and a number of model pruning criteria is employed to prune the model to derive the improved alternate disk block allocation. As illustrated, at step 252, reallocation optimizer 40 reads the disk location accessed, and constructs a model for the disk locations accessed. For the illustrated embodiment, where the unit of allocation of the file subsystem is a file cluster, reallocation optimizer 40 creates a node in the model to represent each file cluster accessed. Additionally, reallocation optimizer 40 creates a transition arc to connect two nodes to represent a successive access relationship between the clusters represented. A weight is assigned to each transition arc to represent the probability of the transition being made. The weight (probability) is computed based on the number of occurrences of the transition observed, relative to other transitions from the node. For example, if 6 and 4 transitions from node A to nodes B and C respectively are observed, the transition arc joining nodes A and B is assigned with the weight or probability of 0.6, whereas the transition arc joining nodes A and C is assigned with the weight or probability of 0.4. Other weighting approaches may be employed. Any one of a number of data structures known for storing Markovian chains may be employed to store the node and the transition arc data.

Figure 17A:
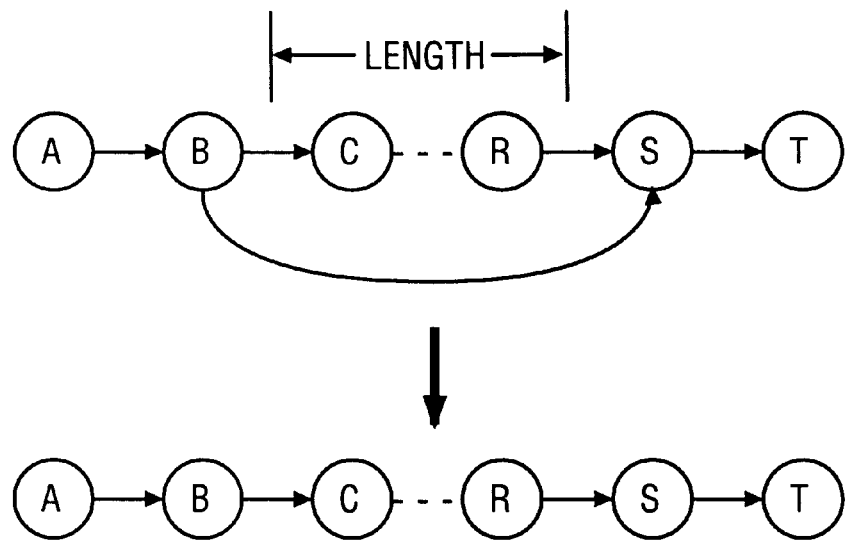
FIG. 17a–17e illustrate a number of model pruning criteria.

At step 254, reallocation optimizer 40 traverses the model to eliminate all forward "rejoining" transition arcs with lengths, measured in terms of the number of intermediate nodes between the connected nodes, that are shorter than a first pre-determined threshold (see FIG. 17a, for ease of illustration, only one forward "rejoining" transition arc is shown). In one embodiment, the first pre-determined threshold is set to a pre-fetch size of the disk drive, which may be dynamically provided by a user prior to an optimization run, pre-configured during installation of disk block reallocator 36, or defaulted to a predetermined most likely value (e.g., the prefetch size of the most popular disk drive).

Figure 17B:
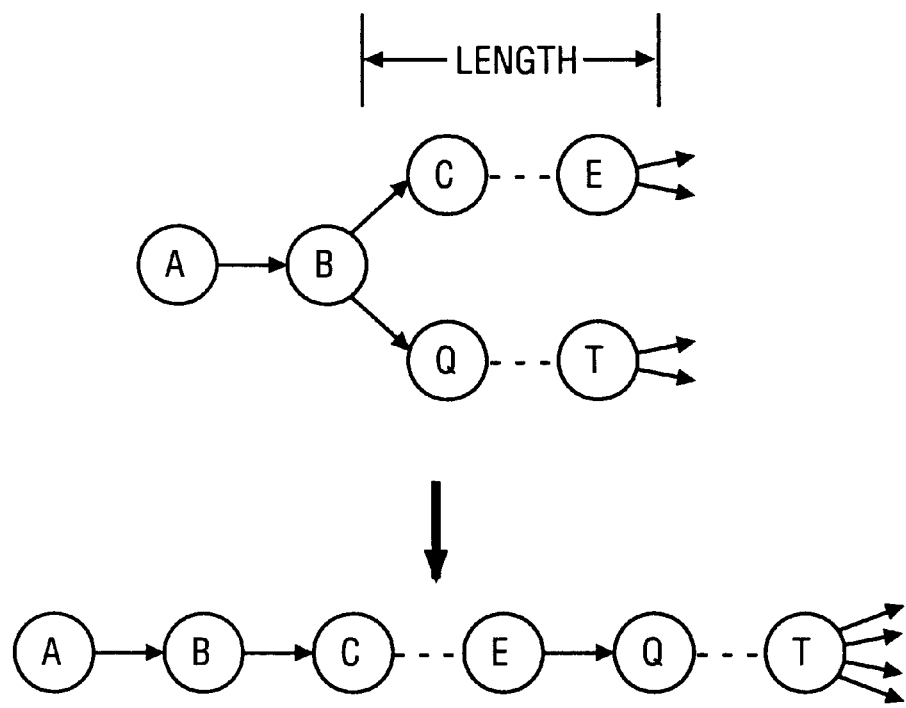

At step 256, reallocation optimizer 40 traverses the model to successively serialize parallel strings emanating from a node with lengths, measured in terms of nodes, that are shorter than a second pre-determined threshold (see FIG. 17b, for ease of illustration, only two parallel emanating strings are shown). Each of the eligible parallel strings (e.g. C ... E) is successively serialized at the beginning of the longest parallel string (i.e. Q ... T). The transition arcs emanating from the last node of each of the serialized strings (e.g. E of C ... E) are added to the last node of the longest parallel string (i.e. T of Q ... T). In one embodiment, one pre-determined threshold is employed as both the first and the second pre-determined threshold, and the common pre-determined threshold is provided in the same manner as described above.

Figure 17C:
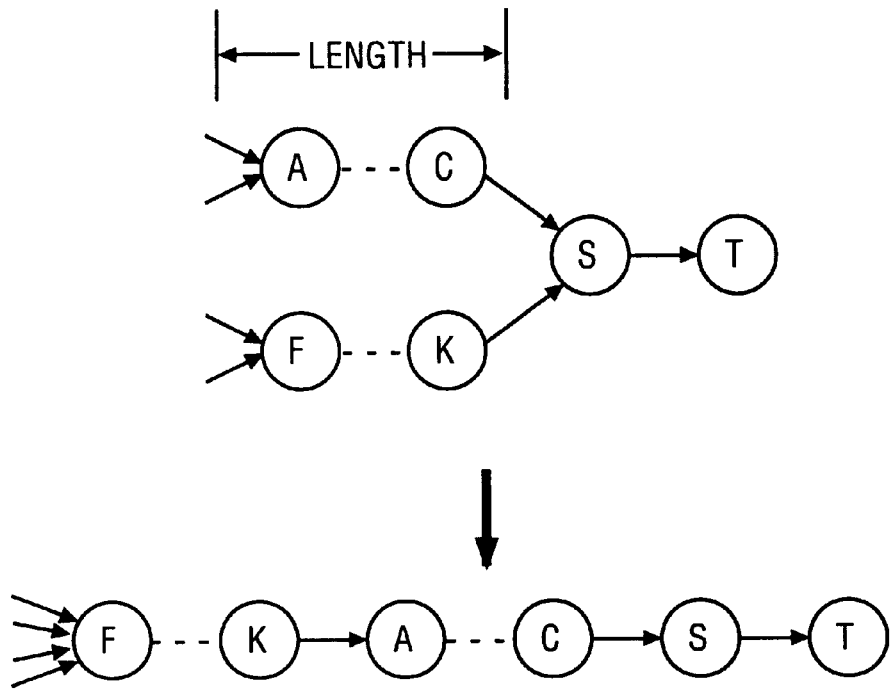

At step 258, reallocation optimizer 40 traverses the model to successively serialize parallel strings joining a node with lengths, measured in terms of nodes, that are shorter than a third pre-determined threshold (see FIG. 17c, for ease of illustration, only two parallel joining strings are shown). Each of the eligible parallel strings (e.g. A ... C) is successively serialized at the end of the longest parallel string (i.e. F ... K). The transition arcs joining the first node of each of the serialized strings (e.g. A of A ... C) are added to the first node of the longest parallel string (i.e. F of F ... K). In one embodiment, one common pre-determined threshold is employed for the first, the second as well as the third pre-determined threshold, and the common pre-determined threshold is provided in the same manner as described above.

Figure 17D:
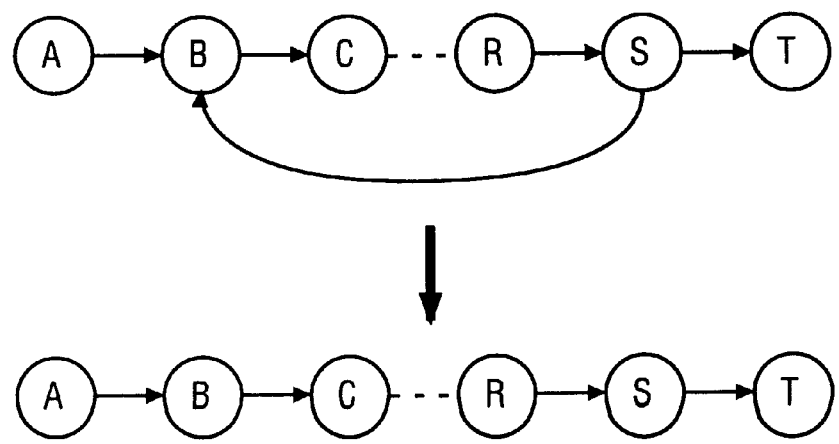
Figure 17E:
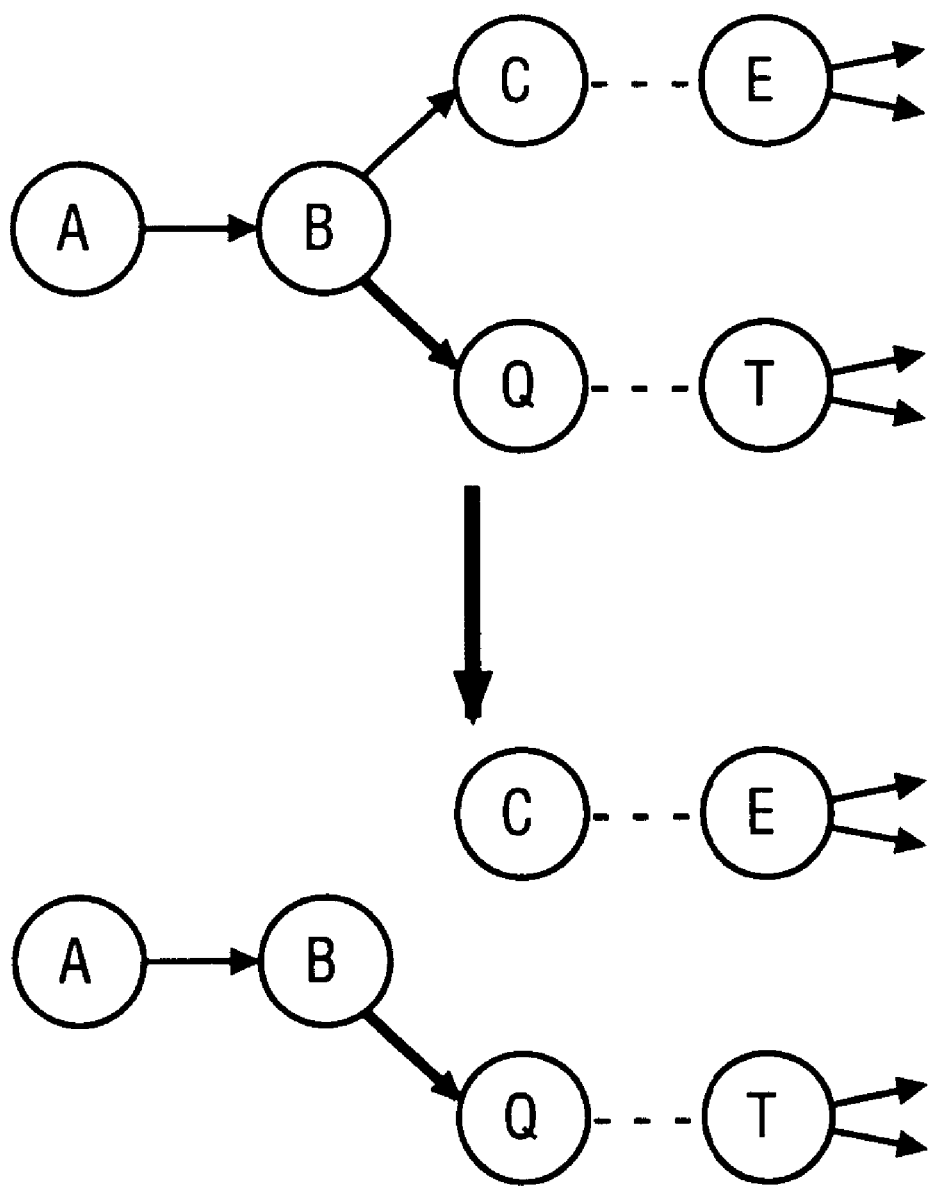

At step 260, reallocation optimizer 40 traverses the model to remove all "cycle forming" backward "rejoining" transition arcs (see FIG. 17d, for ease of illustration, only one "cycle forming" backward "rejoining" transition arc is shown). At step 262, reallocation optimizer 40 traverses the model to remove all less probable incoming transition arcs, as well as all less probably outgoing transition arcs, keeping only the most probable incoming transition arc, and if applicable, the most probable outgoing transition arc, for each node with more than one outgoing or more than one incoming transition arcs (see FIG. 17e, for ease of illustration, only the outgoing case is shown). In other words, at the end of step 262, each node has at most one incoming transition arc, and at most one outgoing transition arc.

Additionally, for the illustrated embodiment, the process loops back to step 254 from step 256, 258, 260 or 262, if a reduction was actually made when applying the pruning criteria, as the reduction may create new opportunities for previously considered pruning criteria. The process continues until all remaining nodes have at most one incoming and one outgoing arc.

In general, the pruning criteria employed in the pruning strategy is devised such that the resultant model represents the portion of the traced accesses where significant performance improvement can mostly likely be obtained, given the performance characteristics of a particular class of disk drives, and the allocation restrictions imposed by the file system as well as the order of access of the traced "workload". The pruning criteria listed here are illustrative, and a number of other pruning criteria based on the characteristics of disk drives are possible.

Returning now briefly to FIGS. 3a–3c, in each embodiment, reallocation vector 46, 46' or 46" specifies the disk block relocations to be performed in a conventional destination oriented manner. However, reallocation engine 36, 36' or 36" includes a transform operation for annotating reallocation vector 46, 46' or 46" with data source information, and equipped with a source oriented data move technique that effectuates the desired disk block relocations keying off the annotated data source information, as disclosed in U.S. patent application, Ser. No. 08/885,327, entitled Source Oriented Data Move Methodology and Applications, filed Jun. 30, 1997, which is hereby fully incorporated by reference. Furthermore, each of the three exemplary applications may further include a data block relocation de-optimization detection function for detecting de-optimizing by a "conflicting" optimization technique, as disclosed in U.S. patent application, Ser. No. 08/885,326, entitled Data Block Relocation De-optimization Detection Methodology and Applications, filed Jun. 30, 1997, which is also hereby fully incorporated by reference.

Figure 15:
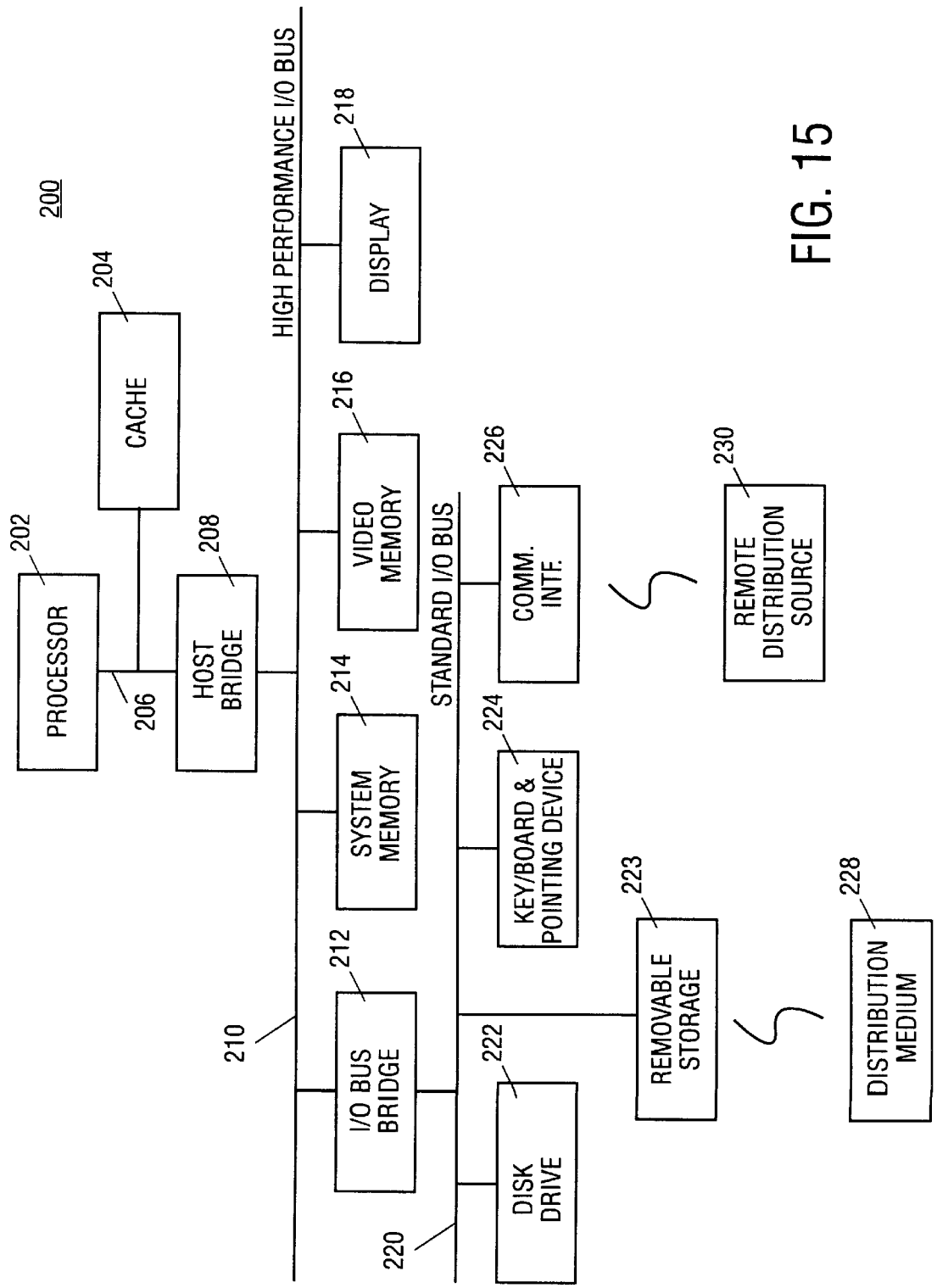
FIG. 15 illustrates one embodiment of a computer system suitable for programming with the embodiment of the present invention illustrated in FIG. 3.
Figure 16:
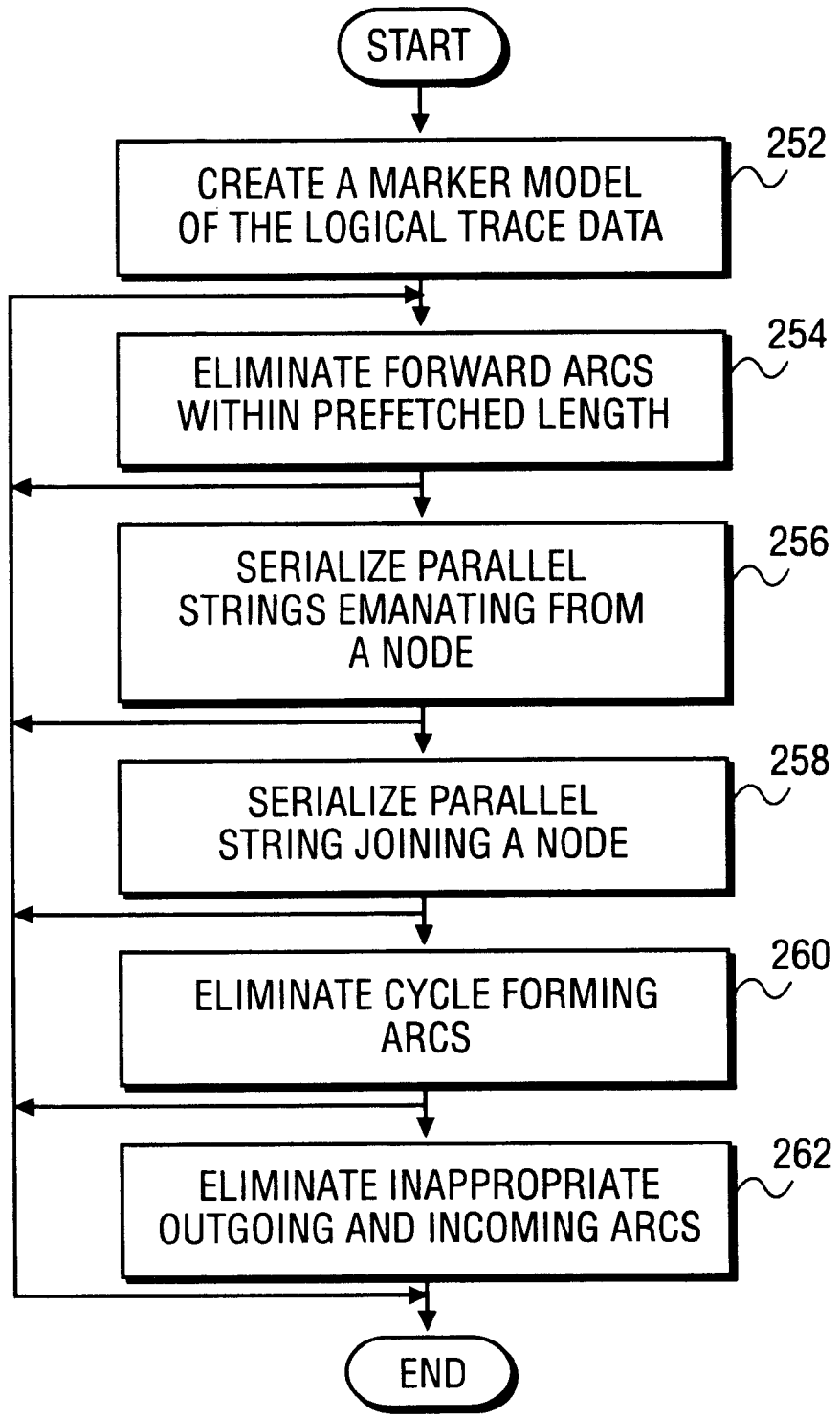
FIG. 16 illustrates yet another alternate embodiment of the operational flow of the reallocation optimizer for generating the improved alternate disk block allocation, employing a model to model a sequence of accesses against the current disk block allocation, and a number of model pruning criteria to prune the model.

FIG. 15 illustrates one embodiment of a computer system suitable for practicing the present invention described above. As shown, for the illustrated embodiment, computer system 200 includes processor 202, processor bus 206, high performance I/O bus 210 and standard I/O bus 220. Processor bus 206 and high performance I/O bus 210 are bridged by host bridge 208, whereas I/O buses 210 and 212 are bridged by I/O bus bridge 212. Coupled to processor bus 206 is cache 204. Coupled to high performance I/O bus 210 are system memory 214 and video memory 216, against which video display 218 is coupled. Coupled to standard I/O bus 220 are disk drive 222, removable storage device 223, keyboard and pointing device 224 and communication interface 226.

These elements perform their conventional functions known in the art. In particular, disk drive 222 and system memory 214 are used to store a permanent and a working copy of the programming instructions for effectuating the teachings of the present invention, when executed by processor 202. The permanent copy may be pre-loaded into disk drive 222 in factory, loaded from distribution medium 228, or down loaded from a remote distribution source 230. Disk drive 222 and system memory 214 may also be used to store similar copies of operating system 34. The constitutions of these elements are known. Any one of a number of implementations of these elements known in the art may be used to form computer system 200.

While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a disk block allocation optimization methodology and its applications have been described.

What is claimed is:

1. An apparatus comprising
    (a) an execution unit for executing programming instructions; and
    (b) a storage medium coupled to the execution unit and having stored therein a plurality of programming instructions to be executed by the execution unit for implementing a disk block reallocator that operates to generate an improved alternate disk block allocation for a current disk block allocation, wherein the disk block reallocator includes a reallocation optimizer that operates to generate the improved alternate disk block allocation employing a model to model a sequence of accesses against the current disk block allocation, including modeling of access orders of atomic allocation units accessed, and a plurality of model pruning criteria to conditionally eliminate a forward rejoining transition arc in accordance with a device characteristic based condition.

2. The apparatus as set forth in claim 1, wherein the reallocation optimizer model the sequence of accesses using nodes and transition arcs joining the nodes to represent atomic allocation units accessed and access orders of the atomic allocation units accessed.

3. The apparatus as set forth in claim 2, wherein the sequence of accesses are made through a file subsystem where disk blocks are allocated in atomic allocation units of file clusters, and the reallocation optimizer assigns a node to represent each file cluster accessed, a transition arc joining two assigned nodes to represent a successive access relationship between the two represented file clusters, and a weight to each transition arc.

4. The apparatus as set forth in claim 1, wherein the reallocation optimizer eliminates a forward rejoining transition arc if the forward rejoining transition arc has an arc length that is shorter than a prefetch size of a class of storage device.

5. The apparatus as set forth in claim 1, wherein the model pruning criteria employed by the reallocation optimizer includes a model pruning criteria of conditionally serializing a selected one of a plurality of parallel strings of nodes emanating from a node in accordance with a device characteristic based condition.

6. The apparatus as set forth in claim 5, wherein the reallocation optimizer selects a parallel string of nodes emanating from the node to be serialized if the parallel string of nodes has a string length that is shorter than a prefetch size of a class of storage device.

7. The apparatus as set forth in claim 5, wherein the reallocation optimizer serializes the selected parallel string of nodes emanating from the node by placing the selected parallel string of nodes in between the node and the longest parallel string of nodes emanating from the node.

8. The apparatus as set forth in claim 1, wherein the model pruning criteria employed by the reallocation optimizer includes a model pruning criteria of conditionally serializing a selected one of a plurality of parallel strings of nodes joining a node in accordance with a device characteristic based condition.

9. The apparatus as set forth in claim 8, wherein the reallocation optimizer selects a parallel string of nodes joining the node to be serialized if the parallel string of nodes has a string length that is shorter than a prefetch size of a class of storage device.

10. The apparatus as set forth in claim 8, wherein the reallocation optimizer serializes the selected parallel string of nodes joining the node by placing the selected parallel string of nodes in between the longest parallel string of nodes joining the node and the node.

11. The apparatus as set forth in claim 1, wherein the model pruning criteria employed by the reallocation optimizer includes a model pruning criteria of eliminating a cycle forming backward rejoining transition arc.

12. The apparatus as set forth in claim 1, wherein the model pruning criteria employed by the reallocation optimizer includes a model pruning criteria of eliminating all less probable transition arcs emanating from a node, keeping only the most probable transition arc emanating from the node.

13. The apparatus as set forth in claim 1, wherein the model pruning criteria employed by the reallocation optimizer includes a model pruning criteria of eliminating all less probable transition arcs joining a node, keeping only the most probable transition arc joining the node.

14. The apparatus as set forth in claim 1, wherein the disk block reallocator further includes a tracer that operates to generate the sequence the accesses.

15. The apparatus as set forth in claim 1, wherein the disk block reallocator further includes a reallocation engine that operates the effectuate the improved alternate disk block allocation if generated.

16. The apparatus as set forth in claim 1, wherein the disk block reallocator is packaged as a standalone utility that can be invoked by a user at will to optimize disk block allocation of any arbitrary sequence of disk block accesses.

17. The apparatus as set forth in claim 1, wherein the disk block reallocator is packaged as an integral part of an installation utility of an application for optimizing disk block allocations for disk blocks accessed by file accesses of the application during start-up of the application.

18. The apparatus as set forth in claim 1, wherein the disk block reallocator is packaged as a standalone utility for optimizing disk block allocations for disk blocks accessed by file accesses of an operating system during start-up/boot time, complementary to a tracer incorporated with the operating system for tracing the file accesses.

19. The apparatus as set forth in claim 1, wherein the apparatus is a computer system.

20. A machine implemented method comprising:
   a) modeling a sequence of accesses against a current disk block allocation, including modeling of access orders of atomic allocation units accessed; and
   b) generating an improved alternate disk block allocation to the current disk block allocation by pruning the model using a number of model pruning criteria, including a model pruning criteria that causes a forward rejoining transition arc to be conditionally eliminated in accordance with a device characteristic based condition.

21. The method as set forth in claim 20, wherein (a) comprises representing atomic allocation units accessed with nodes, and access orders of the atomic allocation units accessed with transition arcs joining the nodes.

22. The method as set forth in claim 21, wherein the sequence of accesses are made through a file subsystem where disk blocks are allocated in atomic allocation units of file clusters, and (a) comprises assigning a node to represent each file cluster accessed, a transition arc joining two assigned nodes to represent a successive access relationship between the two represented file clusters, and a weight to each transition arc.

23. The method as set forth in claim 20, wherein (b) eliminates a forward rejoining transition arc if the forward rejoining transition arc has an arc length that is shorter than a prefetch size of a class of storage device.

24. The method as set forth in claim 20, wherein (b) includes employment of a model pruning criteria that causes a selected one of a plurality of parallel strings of nodes emanating from a node to be conditionally serialized in accordance with a device characteristic based condition.

25. The method as set forth in claim 24, wherein a parallel string of nodes emanating from the node is serialized in (b) if the parallel string of nodes has a string length that is shorter than a prefetch size of a class of storage device.

26. The method as set forth in claim 24, wherein the selected parallel string of nodes emanating from a node is serialized in (b) by placing the selected parallel string of nodes in between the node and the longest parallel string of nodes emanating from the node.

27. The method as set forth in claim 20, wherein (b) includes the employment of a model pruning criteria that causes a selected one of a plurality of parallel strings of nodes joining a node to be conditionally serialized in accordance with a device characteristic based condition.

28. The method as set forth in claim 27, wherein a parallel string of nodes joining the node is serialized in (b) if the parallel string of nodes has a string length that is shorter than a prefetch size of a class of storage device.

29. The method as set forth in claim 28, wherein the selected parallel string of nodes joining the node is serialized in (b) by placing the selected parallel string of nodes in between the longest parallel string of nodes joining the node and the node.

30. The method as set forth in claim 20, wherein (b) includes the employment of a model pruning criteria that causes a cycle forming backward rejoining transition arc to be eliminated.

31. The method as set forth in claim 20, wherein (b) includes the employment of a model pruning criteria that causes all less probable transition arcs emanating from a node to be eliminated, resulting in only the most probable transition arc emanating from the node being kept.

32. The method as set forth in claim 20, wherein (b) includes the employment of a model pruning criteria that causes all less probable transition arcs joining a node to be eliminated, resulting in only the most probable transition arc joining the node to be kept.

33. The method as set forth in claim 20, wherein the method further comprises (c) tracing the sequence of accesses.

34. The method as set forth in claim 20, wherein the method further comprises (c) effectuating the improved alternate disk block allocation if generated.

35. A machine readable storage medium having stored therein a plurality of programming instructions to be executed by the execution unit for implementing a disk block reallocator that operates to generate an improved alternate disk block allocation for a current disk block allocation, wherein the disk block reallocator includes a reallocation optimizer that operates to generate the improved alternate disk block allocation employing a model to model a sequence of accesses against the current disk block allocation, including modeling of access orders of atomic allocation units accessed, and a plurality of model pruning criteria to prune the model, wherein the model pruning criteria employed by the reallocation optimizer includes a model pruning criteria of conditionally eliminating a forward rejoining transition arc in accordance with a device characteristic based condition.

36. The storage medium as set forth in claim 35, wherein the reallocation optimizer models the sequence of accesses using nodes and transition arcs joining the nodes to represent atomic allocation units accessed and access orders of the atomic allocation units accessed.

37. The storage medium as set forth in claim 36, the sequence of accesses are made through a file subsystem where disk blocks are allocated in atomic allocation units of file clusters, and the reallocation optimizer assigns a node to represent each file cluster accessed, a transition arc joining two assigned nodes to represent a successive access relationship between the two represented file clusters, and a weight to each transition arc.

38. The storage medium as set forth in claim 35, wherein the reallocation optimizer eliminates a forward rejoining transition arc if the forward rejoining transition arc has an arc length that is shorter than a prefetch size of a class of storage device.

39. The storage medium as set forth in claim 35, wherein the model pruning criteria employed by the reallocation optimizer includes a model pruning criteria of conditionally serializing a selected one of a plurality of parallel strings of nodes emanating from a node in accordance with a device characteristic based condition.

40. The storage medium as set forth in claim 39, wherein the reallocation optimizer selects a parallel string of nodes emanating from the node to be serialized if the parallel string of nodes has a string length that is shorter than a prefetch size of a class of storage device.

41. The storage medium as set forth in claim 39, wherein the reallocation optimizer serializes the selected parallel string of nodes emanating from the node by placing the selected parallel string of nodes in between the node and the longest parallel string of nodes emanating from the node.

42. The storage medium as set forth in claim 35, wherein the model pruning criteria employed by the reallocation optimizer includes a model pruning criteria of conditionally serializing a selected one of a plurality of parallel strings of nodes joining a node in accordance with a device characteristic based condition.

43. The storage medium as set forth in claim 42, wherein the reallocation optimizer selects a parallel string of nodes joining the node to be serialized if the parallel string of nodes has a string length that is shorter than a prefetch size of a class of storage device.

44. The storage medium as set forth in claim 42, wherein the reallocation optimizer serializes the selected parallel string of nodes joining the node by placing the selected parallel string of nodes in between the longest parallel string of nodes joining the node and the node.

45. The storage medium as set forth in claim 35, wherein the model pruning criteria employed by the reallocation optimizer includes a model pruning criteria of eliminating a cycle forming backward rejoining transition arc.

46. The storage medium as set forth in claim 35, wherein the model pruning criteria employed by the reallocation optimizer includes a model pruning criteria of eliminating all less probable transition arcs emanating from a node, keeping only the most probable transition arc emanating from the node.

47. The storage medium as set forth in claim 35, wherein the model pruning criteria employed by the reallocation optimizer includes a model pruning criteria of eliminating all less probable transition arcs joining a node, keeping only the most probable transition arc joining the node.

* * * * *